US012344186B2

(12) United States Patent
Aoki et al.

(10) Patent No.: US 12,344,186 B2
(45) Date of Patent: Jul. 1, 2025

(54) VEHICLE SEAT

(71) Applicants: NHK SPRING CO., LTD., Yokohama (JP); SUBARU CORPORATION, Tokyo (JP)

(72) Inventors: Jun Aoki, Yokohama (JP); Tomoya Takahashi, Yokohama (JP); Yosuke Ishiyama, Tokyo (JP); Kota Morishima, Tokyo (JP); Taiki Ono, Tokyo (JP)

(73) Assignees: NHK Spring Co., Ltd., Yokohama (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/824,497

(22) Filed: Sep. 4, 2024

(65) Prior Publication Data

US 2025/0083633 A1 Mar. 13, 2025

(30) Foreign Application Priority Data

Sep. 7, 2023 (JP) .................................. 2023-145645

(51) Int. Cl.
*B60R 22/26* (2006.01)
*B60R 22/18* (2006.01)

(52) U.S. Cl.
CPC ...... B60R 22/26 (2013.01); *B60R 2022/1806* (2013.01); *B60R 2022/266* (2013.01)

(58) Field of Classification Search
CPC ..... B60R 22/118; B60R 22/20; B60R 22/206; B60R 2022/021; B60R 2022/1812; B60R 22/26; B60R 2022/1806; B60R 2022/266; B60N 2/90
See application file for complete search history.

(56) References Cited

U.S. PATENT DOCUMENTS

| 11,312,268 B2 * | 4/2022 | Miyazaki | ................ B60R 22/18 |
| 11,643,045 B2 * | 5/2023 | Kimura | .................... B60R 22/02 |
| | | | 297/468 |
| 2009/0094807 A1 * | 4/2009 | Sugimoto | ............... B60R 22/03 |
| | | | 701/45 |

FOREIGN PATENT DOCUMENTS

| DE | 602004002916 T2 * | 8/2007 | ......... A44B 11/2569 |
| JP | 2019-156120 A | 9/2019 | |

OTHER PUBLICATIONS

Computer generated English translation of DE 60 2004 002916 (Year: 2025).*

* cited by examiner

*Primary Examiner* — Drew J Brown
*Assistant Examiner* — Tiffany L Webb
(74) *Attorney, Agent, or Firm* — Knobbe, Martens, Olson & Bear, LLP

(57) ABSTRACT

A vehicle seat includes: an anchor member, a buckle apparatus, a cushion pad provided with a buckle accommodation cavity, a wire disposed so as to encircle the buckle accommodation cavity and supporting the cushion pad, and a rotation suppression member. The buckle apparatus includes: a coupling member, one end of which is coupled to the anchor member, and a buckle at which a tongue provided at a seatbelt can be removably attached, another end of the coupling member being coupled to the buckle, and the buckle being rotatable substantially in a seat vertical direction. The rotation suppression member is disposed at an upper side of the buckle apparatus, the rotation suppression member is attached to the wire and suppresses rotation in a seat upward direction of the buckle apparatus.

6 Claims, 8 Drawing Sheets

VEHICLE SEAT

CROSS-REFERENCE TO RELATED APPLICATION

This application claims priority under 35 USC 119 from Japanese Patent Application No. 2023-145645 filed Sep. 7, 2023, the disclosure of which is incorporated by reference herein in its entirety.

BACKGROUND

Technical Field

The present disclosure relates to a vehicle seat.

Related Art

Japanese Patent Application Laid-Open (JP-A) No. 2019-156120 discloses a rear seat for a vehicle in which a buckle is accommodated in a buckle stowing portion of a first pad.

SUMMARY

In a vehicle seat, at a time of collision of the vehicle, restraint of a target location of a pelvic region by a seatbelt is preferable.

The present disclosure is to restrain a target location of a pelvic region of a seated occupant with a seatbelt at a time of collision of a vehicle.

A vehicle seat according to a first aspect of the present disclosure includes: an anchor member; a buckle apparatus; a cushion pad provided with a buckle accommodation cavity that accommodates the buckle apparatus; a wire disposed so as to encircle the buckle accommodation cavity, the wire supporting the cushion pad; and a rotation suppression member disposed at an upper side of the buckle apparatus, the rotation suppression member being attached to the wire and suppressing rotation, in a seat upward direction, of the buckle apparatus.

The buckle apparatus includes a coupling member, one end of which is coupled to the anchor member, and a buckle at which a tongue provided at a seatbelt can be removably attached, another end of the coupling member being coupled to the buckle, and the buckle being rotatable substantially in a seat vertical direction.

According to the vehicle seat of the first aspect, the rotation suppression member is attached to the wire at an upper side of the buckle apparatus and suppresses seat upward rotation of the buckle apparatus. At a time of collision of the vehicle (for example, during a frontal collision), seat upward rotation of the buckle apparatus is suppressed. Consequently, at a time of collision of the vehicle, a target location of the pelvic region of a seated occupant may be restrained by the seatbelt.

In a vehicle seat according to a second aspect of the present disclosure, in the vehicle seat according to the first aspect, the rotation suppression member is a bracket formed in a plate shape, the bracket being provided in an attitude that is substantially parallel with a rotation direction of the buckle apparatus.

According to the vehicle seat of the second aspect, because the bracket is provided in an attitude parallel with the rotation direction of the buckle apparatus, when the buckle apparatus rotates to seat upward, the buckle apparatus makes linear contact with the bracket. The buckle apparatus comes into contact with the bracket at a target location and a rotation force of the buckle apparatus is suppressed. Thus, at a time of collision of the vehicle, a target location of the pelvic region may be restrained by the seatbelt.

In a vehicle seat according to a third aspect of the present disclosure, in the vehicle seat according to the first aspect, the rotation suppression member is a bracket formed in a plate shape, the bracket being provided in an attitude that intersects a rotation direction of the buckle apparatus.

According to the vehicle seat of the third aspect, because the bracket is provided in an attitude intersecting the rotation direction of the buckle apparatus, when the buckle apparatus rotates to seat upward, the buckle apparatus makes area contact with the bracket. Therefore, a rotation force of the buckle apparatus is braced by a large area of the bracket and a load is dispersed. Thus, at a time of collision of the vehicle, a target location of the pelvic region may be restrained by the seatbelt.

In a vehicle seat according to a fourth aspect of the present disclosure, in the vehicle seat according to the first aspect, the rotation suppression member includes a first portion that is parallel with a rotation direction of the buckle apparatus, and a second portion that intersects the rotation direction of the buckle apparatus.

According to the vehicle seat of the fourth aspect, because the rotation suppression member is provided with the first portion that is substantially parallel with the rotation direction of the buckle apparatus, when the buckle apparatus rotates to seat upward, the buckle apparatus makes linear contact with the first portion. Therefore, the buckle apparatus comes into contact with the bracket at a target location and a rotation force of the buckle apparatus is suppressed. Further, because the rotation suppression member is provided with the second portion intersecting the rotation direction of the buckle apparatus, when the buckle apparatus rotates to seat upward, the buckle apparatus makes area contact with the second portion. Therefore, a rotation force of the buckle apparatus is braced by a large area of the bracket and a load is dispersed. Thus, at a time of collision of the vehicle, a target location of the pelvic region may be restrained by the seatbelt.

In a vehicle seat according to a fifth aspect of the present disclosure, in the vehicle seat according to the first aspect or the second aspect, the wire is attached to the rotation suppression member at a rear end side with respect to a direction of the seat upward rotation of the buckle apparatus.

According to the vehicle seat of the fifth aspect, because the wire is attached to the rotation suppression member at the rear end side with respect to the rotation direction to seat upward of the buckle apparatus, a load generated by rotation of the buckle apparatus is dispersed from the rotation suppression member into the wire. Consequently, at a time of collision of the vehicle, a target location of the pelvic region may be restrained by the seatbelt.

In a vehicle seat according to a sixth aspect of the present disclosure, in the vehicle seat according to the first aspect, the rotation suppression member is formed of foam resin.

According to the vehicle seat of the sixth aspect, the rotation suppression member is formed of foam resin, when the buckle apparatus rotates to seat upward, a rotation force of the buckle apparatus is absorbed by the foam resin. Consequently, at a time of collision of the vehicle, a target location of the pelvic region may be restrained by the seatbelt.

According to a vehicle seat in the present disclosure, at a time of collision of a vehicle, a target location of a pelvic region of a seated occupant may be restrained by a seatbelt.

DETAILED DESCRIPTION

First Exemplary Embodiment

Figure 1:
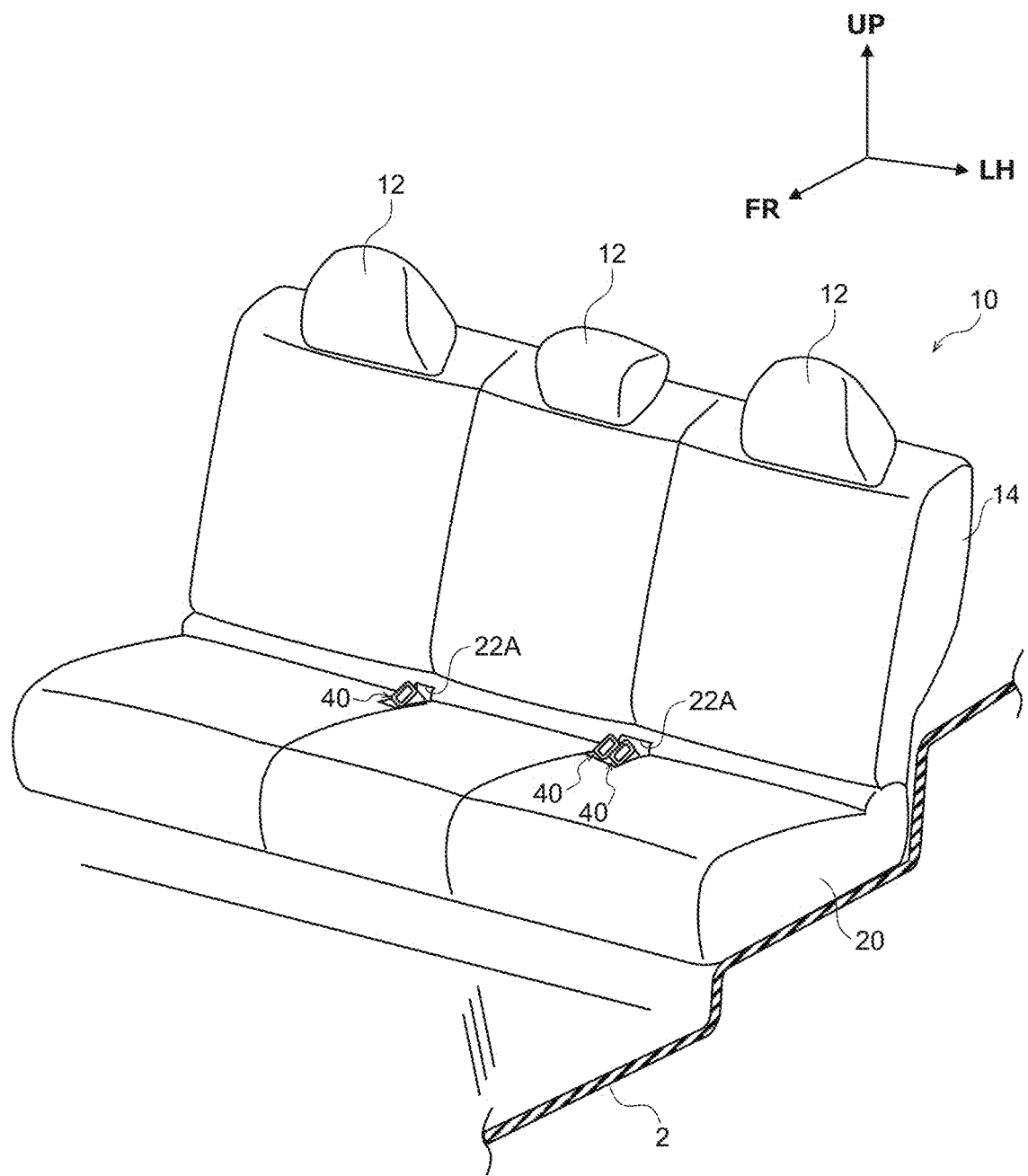
FIG. 1 is a perspective view showing a vehicle seat according to a first exemplary embodiment.

A vehicle seat according to the first exemplary embodiment is described with reference to the drawings. In the first exemplary embodiment, an example in which the vehicle seat is a rear seat is described. The arrow FR that is shown where appropriate in the drawings indicates a front side in a seat front-rear direction, an arrow UP indicates an upper side in a seat vertical direction, and an arrow LH indicates a left side in a seat width direction. In the first exemplary embodiment, the seat front direction coincides with a vehicle front direction.

—Structure of the Vehicle Seat 10—

As shown in FIG. 1, a vehicle seat 10 is fixed to a vehicle body floor 2. The vehicle seat 10 is provided with a headrest 12, a seat back 14 and a seat cushion 20. The headrest 12 supports the head region of a seated vehicle occupant from the rear side. The seat back 14 supports the back region of the seated vehicle occupant from the rear side. The seat cushion 20 supports the buttocks region of the seated vehicle occupant from the lower side.

Figure 3:
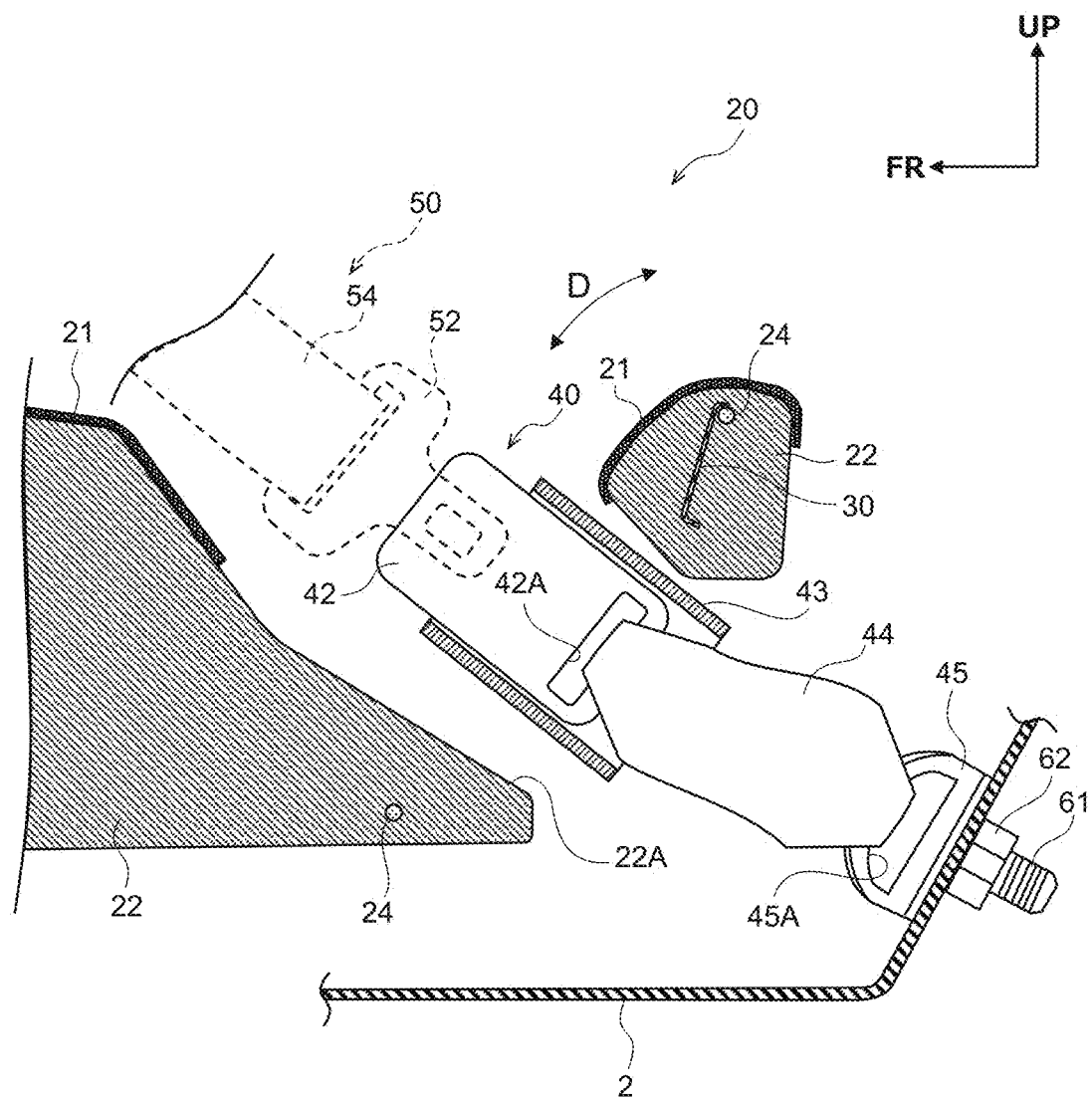
FIG. 3 is a sectional diagram showing the vehicle seat according to the first exemplary embodiment, showing section A-A in FIG. 2.

As shown in FIG. 3, the vehicle occupant sitting on the vehicle seat 10 is restrained by a buckle apparatus 40 and seatbelt apparatus 50 that are attached to the vehicle body.

—Seatbelt Apparatus 50—

The seatbelt apparatus 50 is provided with a webbing (a seatbelt) 54, a retractor (not shown in the drawings) and a tongue 52. The webbing 54 restrains the upper body of the seated vehicle occupant. The retractor is provided at a proximal end of the webbing 54 and takes up the webbing 54, allowing pull-out. The webbing 54 passes through the tongue 52.

—Buckle Apparatus 40—

The buckle apparatus 40 is provided with a buckle 42, an anchor member 45, a coupling member 44, and a boot 43. The buckle 42 enables attachment and removal of the tongue 52. The anchor member 45 is fixed to the vehicle body floor 2. The coupling member 44 couples the buckle 42 with the anchor member 45. The boot 43 accommodates a portion of the buckle 42 and a portion of the coupling member 44.

—Buckle 42—

When the tongue 52 is connected to the buckle 42, the seated vehicle occupant is restrained by the webbing 54. More specifically, in a state in which the webbing 54 is wrapped round the body of a vehicle occupant sitting on the vehicle seat 10, when the tongue 52 is connected with the buckle 42, the webbing 54 is applied to the pelvic region of the seated vehicle occupant. An aperture 42A is formed at the rear end side of the buckle 42.

—Coupling Member 44—

A distal end side (other end side) of the coupling member 44 is coupled to the aperture portion 42A. The coupling member 44 may be, for example, a webbing formed in a belt shape.

—Anchor Member—

The anchor member 45 is formed in an "L" shape in cross section, and is attached to the vehicle body floor 2 by a bolt 61 and nut 62. An aperture 45A is formed at a distal end of the anchor member 45. A rear end side (one end side) of the coupling member 44 is coupled to the aperture portion 45A.

—Boot 43—

The boot 43 is formed, for example, of resin in a tube shape with a rectangular cross section. The boot 43 is structured so as to accommodate at least a portion of one or two of the buckle 42. More specifically, a rear end portion of the buckle 42 and a distal end portion of the coupling member 44 are disposed inside the boot 43.

In the buckle apparatus 40 structured as described above, in a state in which a seated vehicle occupant is restrained by the webbing 54, rotation of the coupling member 44, the buckle 42 and the boot 43 in the seat vertical direction is allowed, pivoting round a portion at which the coupling member 44 is coupled with the anchor member 45. The direction in which the coupling member 44, buckle 42 and boot 43 rotate is referred to as a rotation direction D.

—Seat Cushion 20—

As shown in FIG. 3, the seat cushion 20 is provided with a cover 21, a cushion pad 22 and a wire 24.

—Cushion Pad 22—

The cushion pad 22 is attached to the vehicle body floor 2. The cushion pad 22 is formed by, for example, injecting a resin foam material such as polyurethane resin or the like into the interior of a mold and causing the resin foam material to foam inside the mold.

Figure 2:
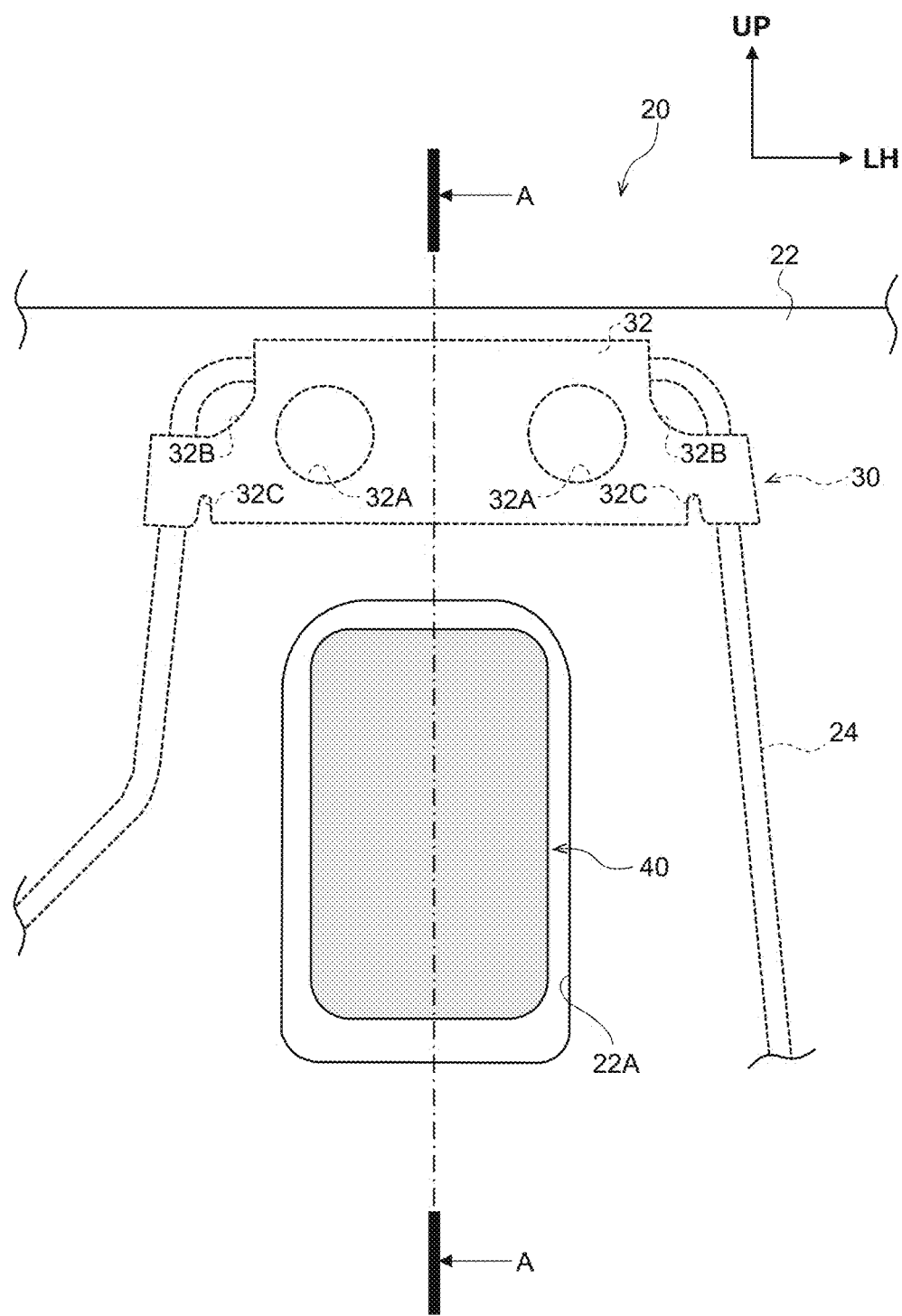
FIG. 2 is an elevation view showing the surroundings of a buckle apparatus according to the first exemplary embodiment.

As shown in FIG. 2 and FIG. 3, a buckle accommodation aperture 22A is formed in the cushion pad 22 at a location at which the buckle apparatus 40 is provided. The buckle accommodation aperture 22A is a rectangular penetrating hole that penetrates diagonally toward the seat upper-front.

—Cover 21—

The cover 21 is provided so as to cover the cushion pad 22. The cover 21 may be formed of, for example, a non-woven fabric, cloth, leather, synthetic leather or an alternative material.

—Wire 24—

The wire 24 is formed by bending a rod-shaped steel member. The wire 24 extends in the seat front-rear direction and the seat width direction. A plural number of the wire 24 are provided inside the cushion pad 22. The wires 24 are structured so as to brace a load acting on a sitting surface of the seat cushion 20 via the cushion pad 22.

One of the wires 24 is disposed so as to encircle the buckle accommodation aperture 22A at an upper side and at both sides of the buckle accommodation aperture 22A.

—Rotation Suppression Member 30—

As shown in FIG. 2 and FIG. 3, a rotation suppression member 30 is attached to the wire 24 that is disposed so as to encircle the buckle accommodation aperture 22A. The rotation suppression member 30 is provided at a seat upper side of the buckle apparatus 40 and suppresses rotation, in the seat upward direction, of the buckle apparatus 40.

The rotation suppression member 30 is a bracket that is formed in a plate shape. The rotation suppression member 30 is provided in an attitude that is substantially parallel with the rotation direction D of the buckle apparatus 40.

Figure 4:
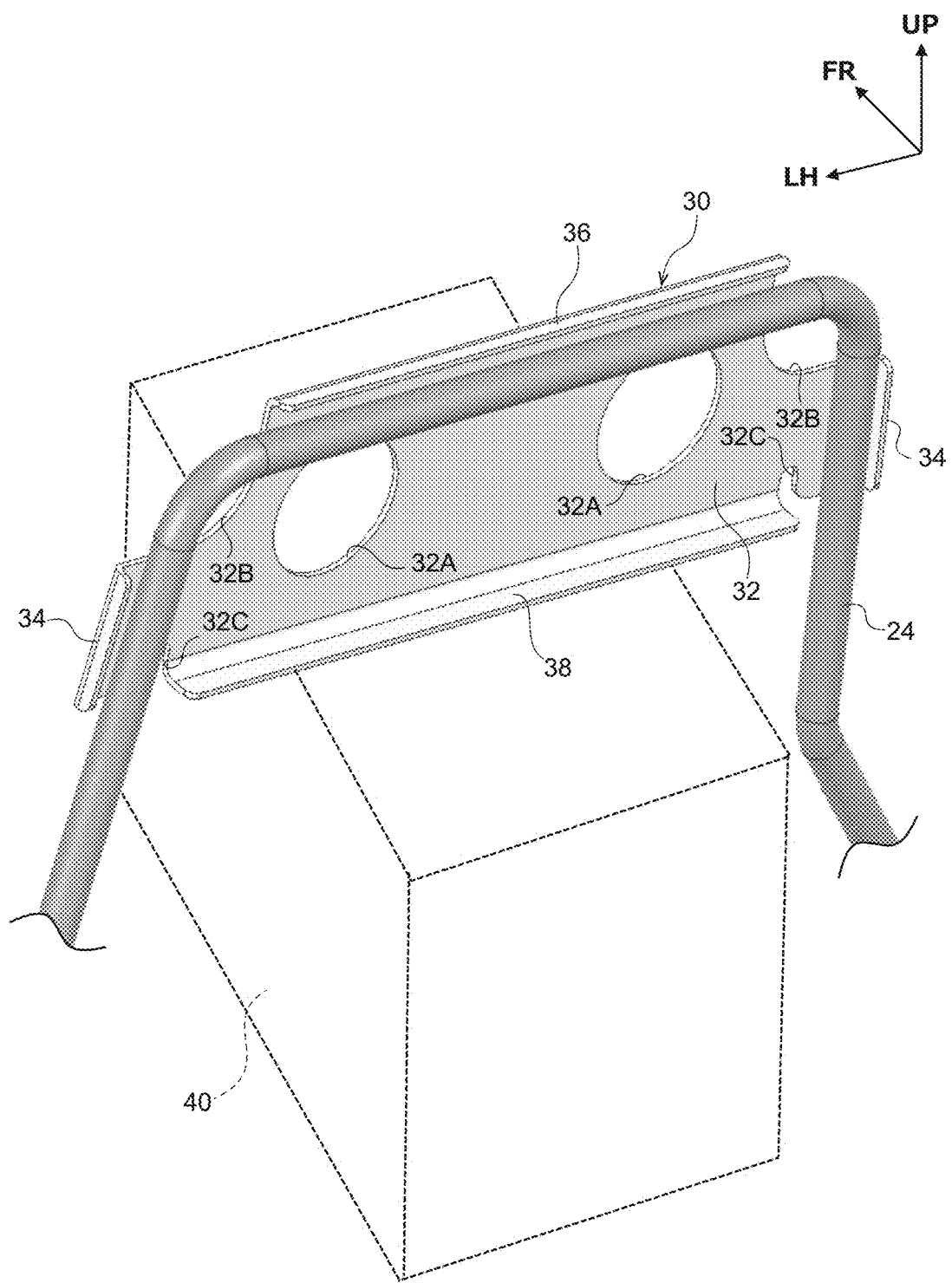
FIG. 4 is a perspective view showing the surroundings of the buckle apparatus according to the first exemplary embodiment.

As shown in FIG. 4, the rotation suppression member 30 is structured with a base portion 32, a first inflection portion 36, a second inflection portion 38 and third inflection portions 34.

The base portion 32 is formed in a substantially rectangular plate shape with a plate thickness direction in a direction intersecting the rotation direction D. Two penetrating holes 32A arrayed in the seat width direction are formed in the base portion 32. First cutaway portions 32B in substantially circular arc shapes are formed at both ends in the seat width direction of the upper end of the base portion 32. The first cutaway portions 32B open to seat upward and seat sideward. Second cutaway portions 32C are formed below the first cutaway portions 32B at the lower end of the base portion 32. The second cutaway portions 32C open to seat downward.

The first inflection portion 36 extends toward the seat rear from the upper end of the base portion 32. The second inflection portion 38 extends toward the seat rear from the lower end of the base portion 32. The third inflection portions 34 extend toward the seat rear from both seat side end portions of the base portion 32.

The first inflection portion 36 and the third inflection portions 34 are hooked round the wire 24. Thus, the rotation suppression member 30 is attached to the wire 24. The wire 24 is attached to the rotation suppression member 30 at a rear end side (downstream side) of the rotation direction D of the buckle apparatus 40. The rotation suppression member 30 may be attached to the wire 24 by welding or the like.

The rotation suppression member 30 is provided in an attitude that is substantially parallel with the rotation direction D of the buckle apparatus 40. Thus, the rotation suppression member 30 is provided in an attitude substantially in line with the rotation direction D of the buckle apparatus 40.

—Operation of the Vehicle Seat 10—

Figure 5:
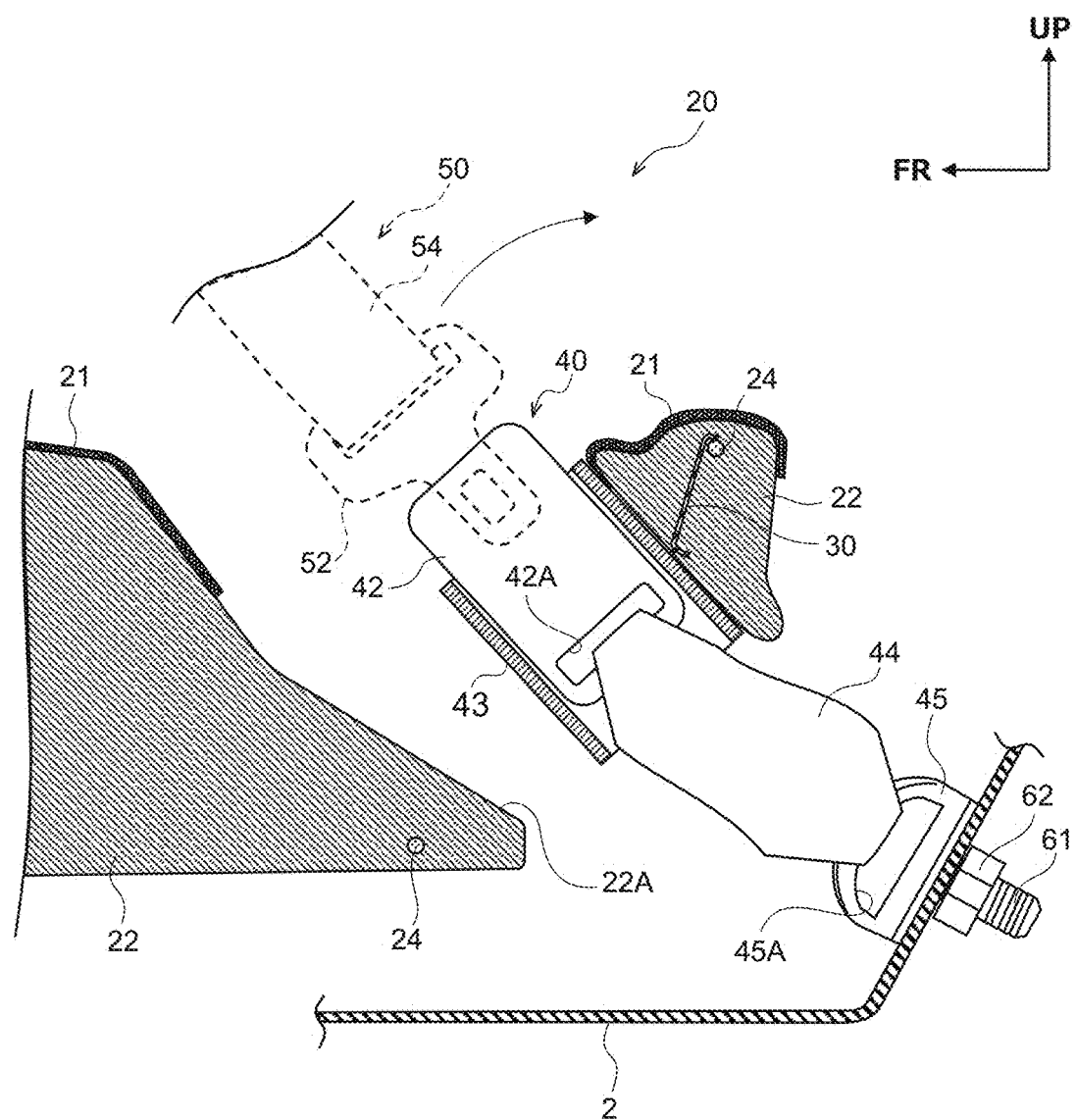
FIG. 5 is a sectional diagram showing the vehicle seat according to the first exemplary embodiment, showing an action of the buckle apparatus in a case in which the vehicle has a frontal collision.

When the vehicle has a frontal collision in the state in which the webbing 54 is applied to the pelvic region of a seated vehicle occupant, the coupling member 44, buckle 42 and boot 43 rotate in the seat upward direction, pivoting around the portion at which the coupling member 44 is coupled to the anchor member 45, as illustrated in FIG. 5. The boot 43 then abuts against the lower end of the rotation suppression member 30 with the cushion pad 22 therebetween.

As a result, rotation of the coupling member 44, buckle 42 and boot 43 in the seat upward direction is blocked.

—Operation—

The vehicle seat 10 according to the first exemplary embodiment is provided with the buckle accommodation aperture 22A that accommodates the buckle apparatus 40 in the cushion pad 22. The buckle apparatus 40 is provided with the anchor member 45 fixed to the vehicle body floor 2, the coupling member 44 one end of which is coupled to the anchor member 45, and the buckle 42 to which the other end of the coupling member 44 is coupled. The buckle 42 is rotatable in the seat vertical direction, and the tongue provided at the webbing 54 is removably attached to the buckle 42. The cushion pad 22 provided with the buckle accommodation aperture 22A is provided with the wire 24 that is disposed so as to encircle the buckle accommodation aperture 22A and that supports the cushion pad 22, and with the rotation suppression member 30 (see FIG. 3). The rotation suppression member 30 is attached to the wire 24 at the upper side of the buckle apparatus 40 and suppresses rotation of the buckle apparatus 40 in the seat upward direction.

Because the rotation suppression member 30 suppresses rotation of the buckle apparatus 40 in the seat upward direction, seat upward rotation of the buckle apparatus 40 at a time of collision of the vehicle (for example, during a frontal collision) is suppressed. Consequently, at a time of collision of the vehicle, a vehicle occupant may be restrained at a target location of the pelvic region by the webbing 54.

In the vehicle seat 10 according to the first exemplary embodiment, the rotation suppression member 30 is a bracket formed in a plate shape, and the bracket is provided in an attitude parallel with the rotation direction D of the buckle apparatus 40 (see FIG. 3).

Because the bracket is provided in the attitude parallel with the rotation direction D of the buckle apparatus 40, when the buckle apparatus 40 rotates in the seat upward direction, the buckle apparatus 40 makes linear contact with the bracket. Therefore, the buckle apparatus 40 comes into contact with the bracket at a target location and a rotation force of the buckle apparatus 40 is suppressed. Thus, at the time of collision of the vehicle, the target location of the pelvic region of the seated occupant may be restrained by the webbing 54.

In the vehicle seat 10 according to the first exemplary embodiment, the wire 24 is attached to the rotation suppression member 30 at the rear end side of the seat upward rotation direction D of the buckle apparatus 40 (see FIG. 3).

Because the wire 24 is attached to the rotation suppression member 30 at the rear end side of the seat upward rotation direction D of the buckle apparatus 40, a load generated by rotation of the buckle apparatus 40 is dispersed from the rotation suppression member 30 into the wire 24. Consequently, at the time of collision of the vehicle, the vehicle occupant may be restrained at the target location of the pelvic region by the webbing 54.

Second Exemplary Embodiment

A vehicle seat according to a second exemplary embodiment differs from the vehicle seat according to the first exemplary embodiment in differences in structure of the rotation suppression member. Descriptions of portions whose details are the same as or equivalent to the details described for the first exemplary embodiment are given using the same terminology and reference symbols.

Figure 6:
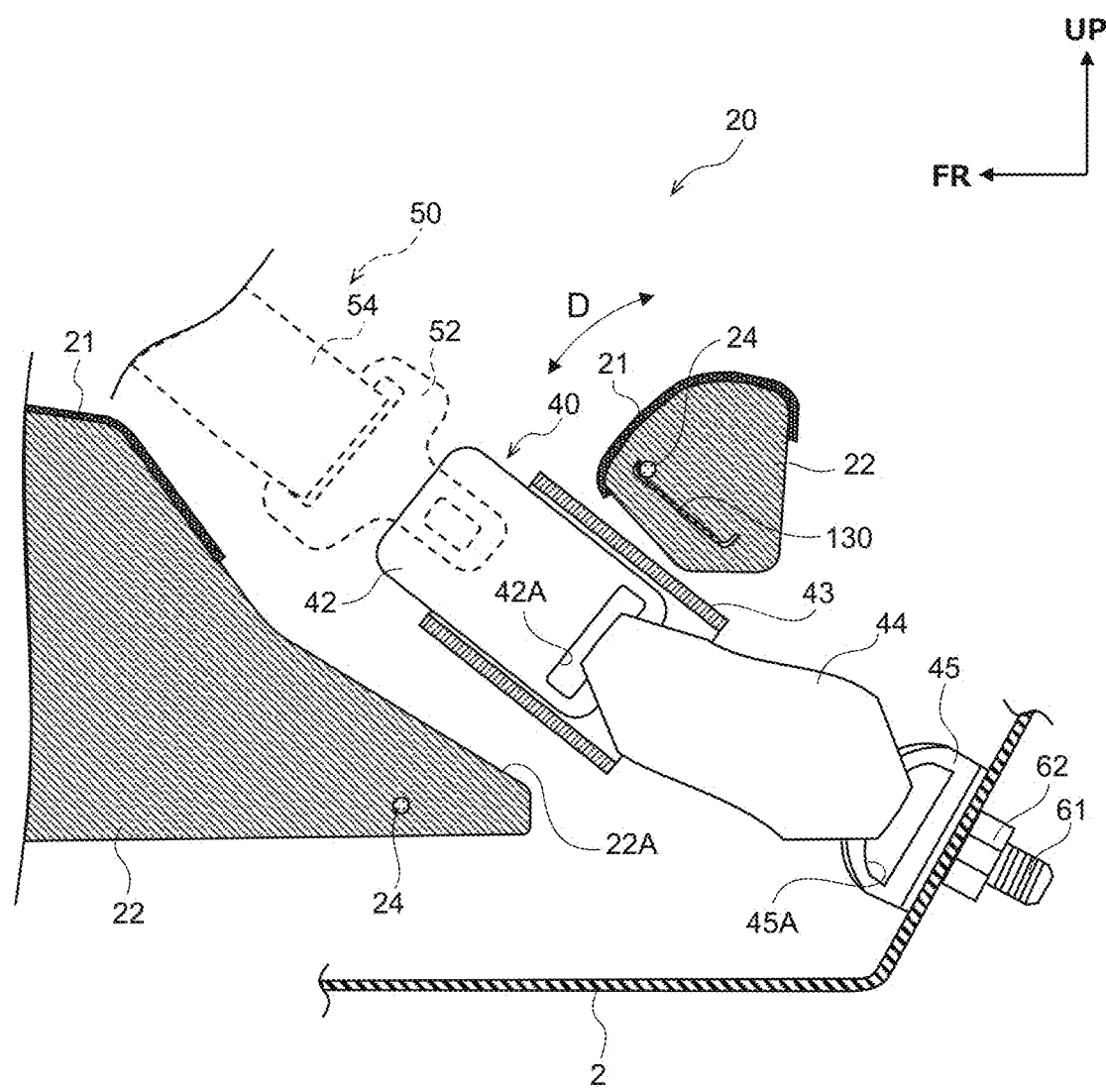
FIG. 6 is a sectional diagram showing a vehicle seat according to a second exemplary embodiment.

As shown in FIG. 6, a rotation suppression member 130 is a bracket formed in a plate shape. The rotation suppression member 130 may be provided in an attitude that intersects the rotation direction D of the buckle apparatus 40. Providing the rotation suppression member 130 in an attitude that is orthogonal to the rotation direction D of the buckle apparatus 40 is preferable.

—Operation—

Because the bracket is provided in the attitude intersecting the rotation direction D of the buckle apparatus 40, when the buckle apparatus 40 rotates in the seat upward direction, the buckle apparatus 40 makes area contact with the bracket. Therefore, a rotation force of the buckle apparatus 40 is braced by a large area of the bracket and a load is dispersed.

Thus, at a time of collision of the vehicle, a target location of the pelvic region of a seated occupant may be restrained by the webbing 54.

Other structures and operational effects are substantially the same as in the exemplary embodiment described above and accordingly are not described here.

Third Exemplary Embodiment

A vehicle seat according to a third exemplary embodiment differs from the vehicle seat according to the first exemplary embodiment in differences in structure of the rotation suppression member. Descriptions of portions whose details are the same as or equivalent to the details described for the first exemplary embodiment are given using the same terminology and reference symbols.

Figure 7:
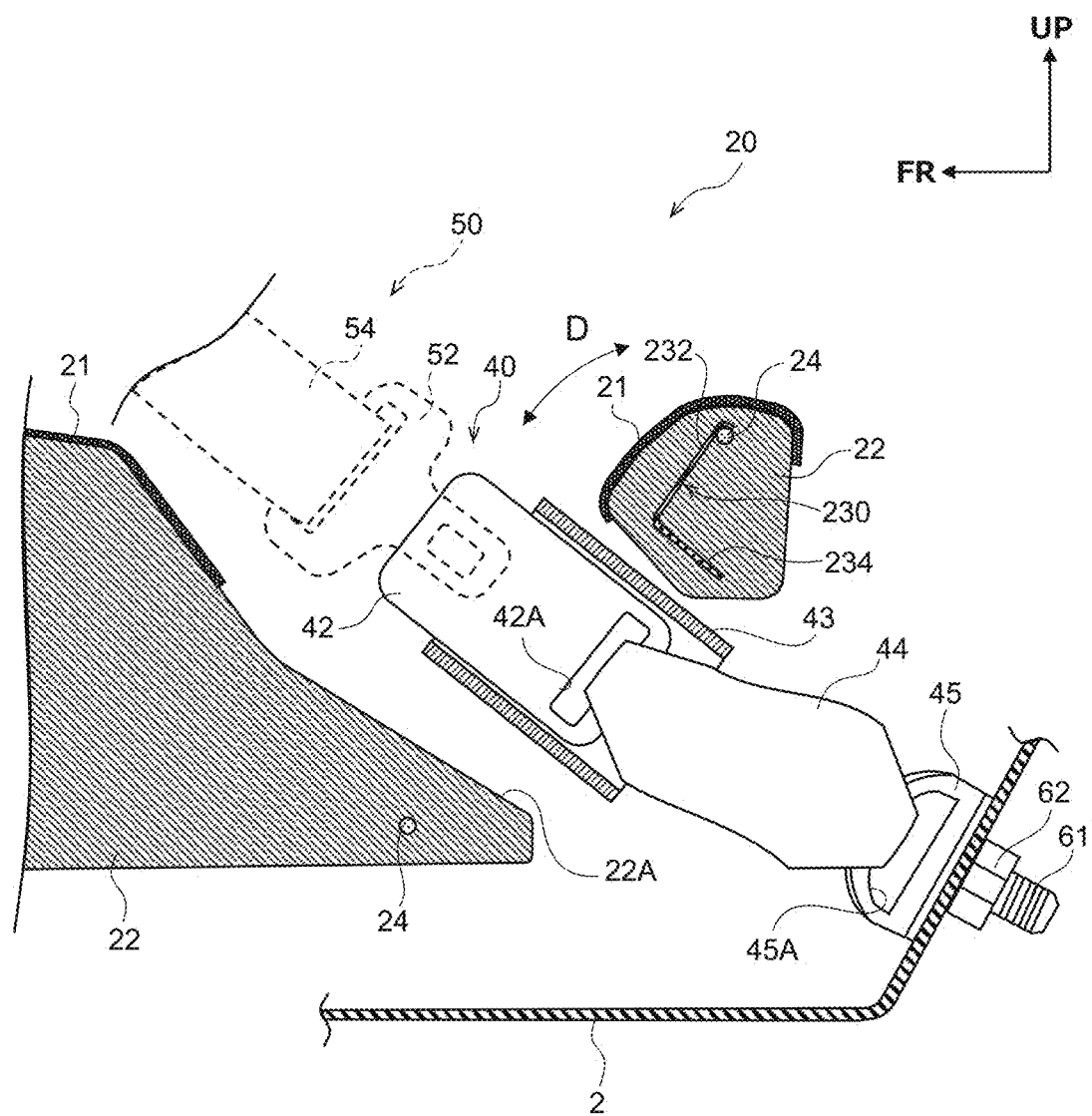
FIG. 7 is a sectional diagram showing a vehicle seat according to a third exemplary embodiment.

As shown in FIG. 7, a rotation suppression member 230 is a bracket in which a metal plate is machined by bending. The rotation suppression member 230 is formed is formed substantially in an "L" shape in cross section, of a first portion 232 and a second portion 234. The first portion 232 is provided in an attitude that is substantially parallel with the rotation direction D of the buckle apparatus 40, and the second portion 234 is provided in an attitude that intersects the rotation direction D of the buckle apparatus 40. The rotation suppression member 230 may be formed in a "T" shape in cross section of the first portion 232 and the second portion 234.

—Operation—

Because the rotation suppression member 230 is provided with the first portion 232 in the attitude parallel with the rotation direction D of the buckle apparatus 40, when the buckle apparatus 40 rotates in a seat upward direction, the buckle apparatus 40 makes linear contact with the first portion 232. Therefore, the buckle apparatus 40 comes into contact with the bracket at a target location and a rotation force of the buckle apparatus 40 is suppressed. Further, because the rotation suppression member 230 is provided with the second portion 234 in the attitude intersecting the rotation direction D of the buckle apparatus 40, when the buckle apparatus 40 rotates to seat upward, the buckle apparatus 40 makes area contact with the second portion 234. Therefore, a rotation force of the buckle apparatus 40 is braced by a large area of the bracket and a load is dispersed. Thus, at the time of collision of the vehicle, the target location of the pelvic region of a seated occupant may be restrained by the webbing 54.

Other structures and operational effects are substantially the same as in the exemplary embodiments described above and accordingly are not described here.

Fourth Exemplary Embodiment

A vehicle seat according to a fourth exemplary embodiment differs from the vehicle seat according to the first exemplary embodiment in differences in structure of the rotation suppression member. Descriptions of portions whose details are the same as or equivalent to the details described for the first exemplary embodiment are given using the same terminology and assigning the same reference symbols.

Figure 8:
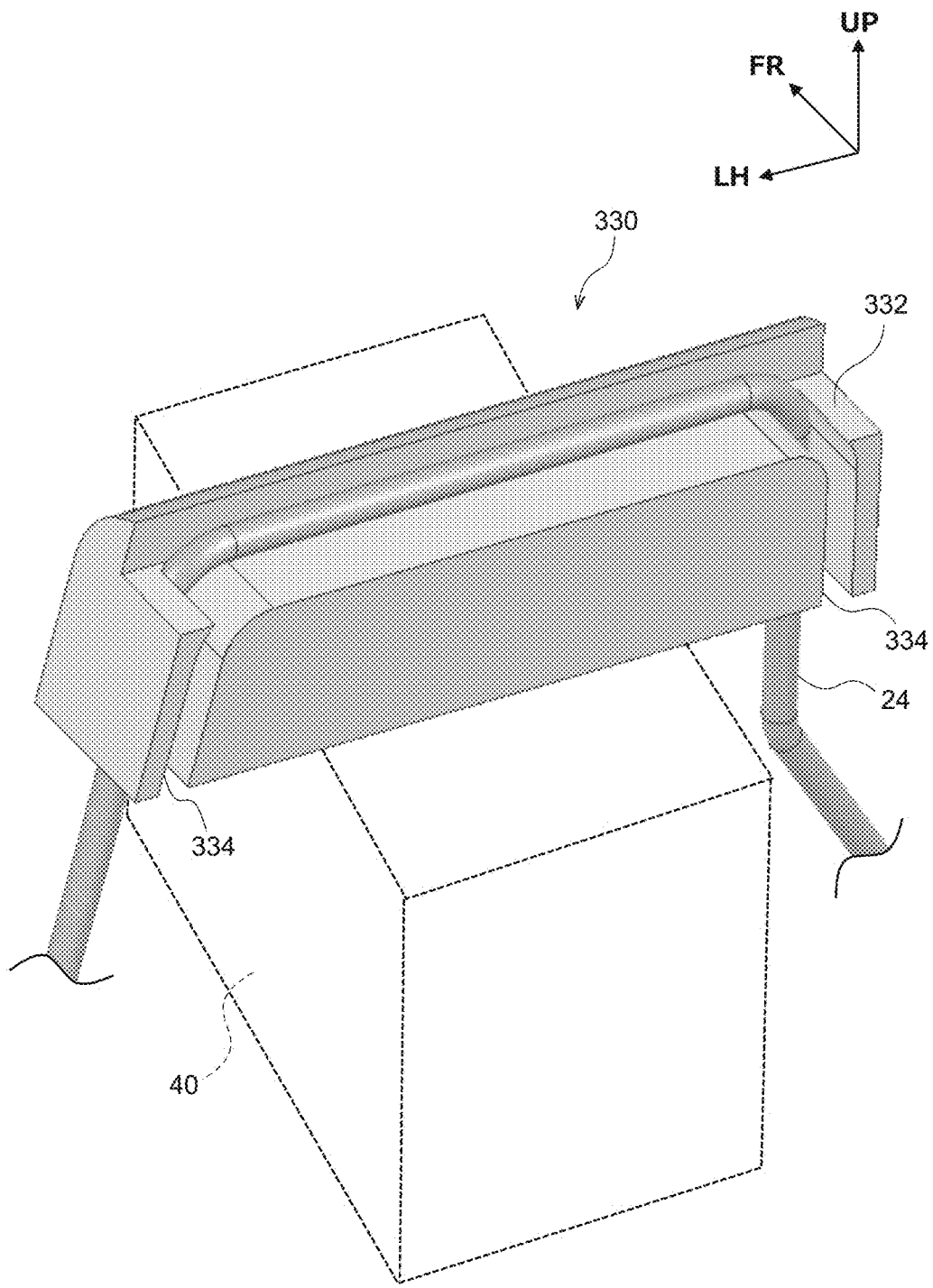
FIG. 8 is a perspective view showing a vehicle seat according to a fourth exemplary embodiment.

As shown in FIG. 8, a rotation suppression member 330 is formed of resin foam (for example, polypropylene foam) in a substantially cuboid shape that is longest in the seat width direction. The rotation suppression member 330 is formed with a cutaway portion 332 and slot portions 334.

The cutaway portion 332 is cut away in an "L" shape in cross section, which is open to seat upper side and seat rear side. The slot portions 334 are formed at both sides in a seat width direction of the rotation suppression member 330 as recessed slots that extend in the seat vertical direction and are open to a seat rear side.

The wire 24 is hooked on the cutaway portion 332, and the wire 24 tightly fits in the slot portions 334. Thus, the rotation suppression member 330 is attached to the wire 24.

—Operation—

Because the rotation suppression member 330 is formed of the resin foam, when the buckle apparatus 40 rotates in a seat upward direction, a rotation force of the buckle apparatus 40 is absorbed by the resin foam. Consequently, at a time of collision of the vehicle, a target location of the pelvic region of a seated occupant may be restrained by the webbing 54.

Other structures and operational effects are substantially the same as in the exemplary embodiment described above and accordingly are not described here.

The vehicle seat of the present disclosure is described above in accordance with the first to fourth exemplary embodiments. However, specific structures are not limited by these exemplary embodiments. Design changes and modifications that do not depart from the scope of the invention that is recited in the attached claims may be embodied.

The first to fourth exemplary embodiments illustrate examples in which the vehicle seat 10 is fixed to the vehicle body floor 2. However, a vehicle seat may be attached to slide rails that are fixed to the vehicle body floor 2, and a position of the vehicle seat in the seat front-rear direction relative to the vehicle body floor 2 may be adjustable.

The first to fourth exemplary embodiments illustrate examples in which the coupling member 44 is a webbing formed in a belt shape. However, the coupling member 44 may be formed of a metal fixture, resin or the like.

The first and third exemplary embodiments illustrate examples in which the wire 24 is attached to the rotation suppression member 30 or 230 at the rear end side in the seat upward rotation direction D of the buckle apparatus 40. However, the wire 24 may also be attached to a rotation suppression member at the front end side in the seat upward rotation direction D of the buckle apparatus 40.

The first to fourth exemplary embodiments illustrate examples in which the buckle apparatus 40 and seatbelt apparatus 50 are attached to the vehicle body. However, the buckle apparatus 40 and seatbelt apparatus 50 may be attached to the vehicle seat.

The first to fourth exemplary embodiments illustrate examples in which the vehicle seat 10 is a rear seat. However, a front seat may be employed as the vehicle seat.

What is claimed is:

1. A vehicle seat comprising:
   an anchor member;
   a buckle apparatus including:
   a coupling member, one end of which is coupled to the anchor member, and
   a buckle at which a tongue provided at a seatbelt can be removably attached, another end of the coupling member being coupled to the buckle, and the buckle being rotatable substantially in a seat vertical direction;
   a cushion pad provided with a buckle accommodation cavity that accommodates the buckle apparatus;
   a wire disposed so as to encircle the buckle accommodation cavity, the wire supporting the cushion pad; and a rotation suppression member disposed at an upper side of the buckle apparatus, the rotation suppression member being attached to the wire and suppressing rotation in a seat upward direction of the buckle apparatus.

2. The vehicle seat according to claim 1, wherein the rotation suppression member is a bracket formed in a plate shape, the bracket being provided in an attitude that is substantially parallel with a rotation direction of the buckle apparatus.

3. The vehicle seat according to claim 1, wherein the rotation suppression member is a bracket formed in a plate shape, the bracket being provided in an attitude that intersects a rotation direction of the buckle apparatus.

4. The vehicle seat according to claim 1, wherein the rotation suppression member includes:
   a first portion that is parallel with a rotation direction of the buckle apparatus, and
   a second portion that intersects the rotation direction of the buckle apparatus.

5. The vehicle seat according to claim 1, wherein the wire is attached to the rotation suppression member at a rear end side with respect to a direction of the seat upward rotation of the buckle apparatus.

6. The vehicle seat according to claim 1, wherein the rotation suppression member is formed of foam resin.

* * * * *